(12) United States Patent
Roof

(10) Patent No.: US 8,002,936 B2
(45) Date of Patent: Aug. 23, 2011

(54) DUAL-WEB METHOD FOR FIXING A RADIATION-CURABLE GEL-INK IMAGE ON A SUBSTRATE

(75) Inventor: Bryan J Roof, Newark, NY (US)

(73) Assignee: Xerox Corporation, Norwalk, CT (US)

( * ) Notice: Subject to any disclaimer, the term of this patent is extended or adjusted under 35 U.S.C. 154(b) by 140 days.

(21) Appl. No.: 12/256,684

(22) Filed: Oct. 23, 2008

(65) Prior Publication Data

US 2010/0101717 A1 Apr. 29, 2010

(51) Int. Cl.
 *B32B 38/14* (2006.01)
 *B32B 37/00* (2006.01)

(52) U.S. Cl. ............... 156/273.7; 156/275.5; 156/275.7; 156/277; 156/324

(58) Field of Classification Search ............... 156/272.2, 156/273.7, 275.5, 277, 247, 269, 324, 244.17, 156/273.5, 275.7; 347/102, 99
See application file for complete search history.

(56) References Cited

U.S. PATENT DOCUMENTS

| | | | | | |
|---|---|---|---|---|---|
| 3,713,938 | A | * | 1/1973 | Sutton | 156/246 |
| 3,794,550 | A | * | 2/1974 | Taillie | 281/21.1 |
| 4,606,962 | A | * | 8/1986 | Reylek et al. | 428/148 |
| 5,380,769 | A | * | 1/1995 | Titterington et al. | 523/161 |
| 5,662,574 | A | * | 9/1997 | Slotten | 492/56 |
| 5,671,678 | A | * | 9/1997 | Bolte et al. | 101/491 |
| 6,355,203 | B1 | * | 3/2002 | Charmes et al. | 264/493 |
| 6,472,056 | B1 | * | 10/2002 | Rea et al. | 428/216 |
| 6,566,024 | B1 | * | 5/2003 | Bourdelais et al. | 430/11 |
| 2006/0090843 | A1 | * | 5/2006 | Steinhardt et al. | 156/247 |
| 2006/0132570 | A1 | * | 6/2006 | Odell et al. | 347/102 |
| 2006/0290760 | A1 | * | 12/2006 | German et al. | 347/102 |
| 2007/0120930 | A1 | * | 5/2007 | Domoto et al. | 347/102 |
| 2008/0122914 | A1 | | 5/2008 | Toma | |

* cited by examiner

*Primary Examiner* — Kat Wyrozebski
*Assistant Examiner* — Scott W Dodds
(74) *Attorney, Agent, or Firm* — Richard A. Castellano; Prass LLP

(57) ABSTRACT

Radiation-curable (such as UV-curable) ink is used to form an image on a moving substrate. A radiation-transmissive web is attached to the substrate, and then radiation is applied to the web and substrate to cure the ink. The resulting combined substrate and web forms a laminated print.

19 Claims, 2 Drawing Sheets

DUAL-WEB METHOD FOR FIXING A RADIATION-CURABLE GEL-INK IMAGE ON A SUBSTRATE

CROSS-REFERENCE TO RELATED APPLICATIONS

Cross-reference is hereby made to the following US Patent Applications, assigned to the assignee hereof: U.S. application Ser. No. 12/256,670, U.S. application Ser. No. 12/256,690, being filed simultaneously herewith; and U.S. application Ser. No. 11/291,284, filed Nov. 30, 2005, now US Patent Application Publication US 2007/0120930 A1.

INCORPORATION BY REFERENCE

The following documents are incorporated by reference in their entireties for the teachings therein: US Patent Application Publication US 2007/0120930 A1; and US Patent Application Publication US 2008/0122914 A1.

TECHNICAL FIELD

The present disclosure relates to printing with radiation-curable inks.

BACKGROUND

US Patent Application Publication US 2008/0122914 A1 discloses compositions for an ultraviolet (UV)-curable ink suitable for use in ink-jet printing. Such inks include one or more co-monomers and a gellant. When exposed to radiation of a predetermined frequency, these co-monomers polymerize and thus bind to any number of types of surfaces. In practical applications, such inks have a viscous property at room temperature, but become more liquid when heated for jetting onto a substrate to form images.

US Patent Application Publication US 2007/0120930 A1 discloses a printing apparatus suitable for use with a radiation-curable ink. The apparatus uses a "transfuse" system, wherein ink forming the desired image is first jetted onto an image receptor in the form of a belt, and then transferred from the image receptor onto a print sheet or other substrate. At various locations along the belt path are disposed ultraviolet radiation sources for partially hardening the ink on the belt before transferring to the print sheet.

Although the above-described apparatus uses an image receptor to apply ink to a print sheet, it would be desirable to provide a system where such an ink as above described could be applied directly to a print sheet or other substrate. One challenge to such a system is that, in practical applications, such inks tend to have a "mayonnaise" consistency at room temperature, but when heated incidental to jetting, change to a low viscosity liquid. A typical ink-jet printing process heats the ink until it is liquid and then directly fires ink droplets from a piezoelectric print head onto the substrate. Once the ejected ink hits the substrate, it changes phase from the liquid back to its more viscous consistency, thereby reducing its penetration into porous media. Once this ink is exposed to UV radiation, photoinitiators in the ink are bombarded with UV radiation and the incident flux converts the monomers present in the ink into a cross linked polymer matrix resulting in a very hard and durable mark on the paper.

However, there is a desire to have the ink leveled prior to having it UV cured. The reason for this is so that gloss is more uniform, missing jets can be masked, and certain applications such as packaging require thin layers of relatively constant thickness. Since these inks have a mayonnaise consistency, they have very little cohesive strength prior to curing. In addition, the inks are typically designed to have good affinity to many materials. This means that conventional methods for flattening a layer of ink tend to fail, because the ink splits and leaves much of the image behind on the device trying to flatten it, such as a traditional fuser roll as familiar in xerography. The present description proposes a way to resolve this issue.

SUMMARY

According to one aspect, there is provided a method of printing on a substrate, comprising: applying ink onto a main surface of the substrate according to image data; applying to the main surface of the substrate a web, the web being substantially transmissive of radiant energy; applying pressure of a predetermined magnitude to the web and the substrate; applying radiant energy to the web and the substrate; and attaching the web to the substrate.

DETAILED DESCRIPTION

Figure 1:
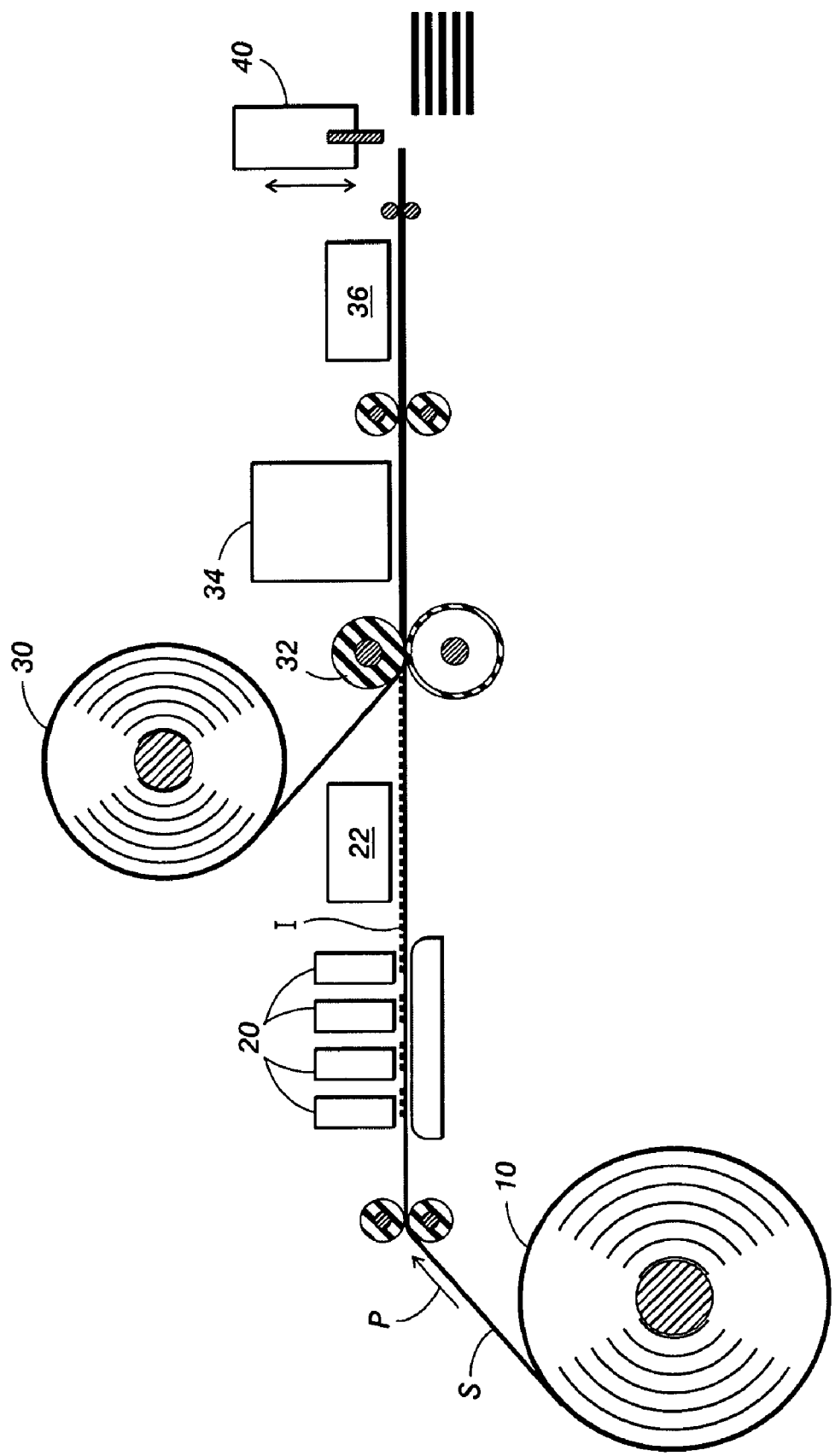
FIG. 1 is a simplified elevational view of a fixing apparatus, as would be found in a larger printing apparatus, according to an embodiment.

FIG. 1 is a simplified elevational view of a printing system. A substrate S, such as of paper or other material on which images are desired to be printed, is spooled off a roll 10. The substrate S is conducted, through a process direction P, to a series of ink-jet printheads 20, which are operated to place different color separations, building to a desired full-color image according to input digital data, onto a main surface of the substrate S. (In the Figure, the ink on substrate S is indicated as I.) Although a "direct-to-paper" arrangement of printheads 20 is shown, in alternate embodiments (not shown) the printheads can direct ink in imagewise fashion first onto an intermediate member such as a drum, which in turn transfers the complete color image onto the substrate S.

In the present embodiment the ink I comprises an ultraviolet (UV)-curable ink, an example of which is described in US Patent Application Publication US 2008/0122914 A1. One embodiment of such an ink includes one or more co-monomers and a gellant. When exposed to radiation of a predetermined frequency, these co-monomers polymerize and thus bind to any number of types of surfaces. In practical applications, such inks have a viscous property at room temperature, but become more liquid when heated for jetting onto a substrate to form images.

Downstream of the printheads 20 along process direction P, there may be disposed a heater 22 that brings the ink I to a predetermined temperature; the precise temperature will depend on the particular composition of the ink I and the desired viscosity or other properties of the ink in the following process.

Following the adjustment of the ink I to a desired temperature, there is applied to the ink-bearing surface of substrate S a web 30. As shown, the web 30 is in the present embodiment unwound from a spool. At or around the point of contact between the web 30 and substrate S, a spreader 32, here comprising two rolls forming a nip, applies a pressure of predetermined magnitude to the web 30 and substrate S, causing the ink I to be squeezed between the web 30 and substrate S, while also removing any entrapped air from between web 30 and substrate S.

The web 30 has distinct physical properties. The web 30 should provide a high surface energy, oleophilic surface against the ink I. Depending on the material set for an embodiment, it may also be desired that the web 30 provide a hydrophilic surface. The web should be transmissive of radiant energy, particularly ultraviolet light in this embodiment. Generally suitable materials for web 30 include polyimide, polypropylene, or the pretreated polyester film known as Melinex®, available from DuPont Teijin Films U.S. Limited Partnership. Corona treatment, as generally known in flexographic printing, can be used to promote adhesion of the web 30 to the substrate S; alternatively, the web 30 can be treated with a thin layer of polyurethane or nitrocellulose.

Once the web 30 is urged against substrate S at spreader 32, the ink I is cured by the application of radiant energy, such as ultraviolet light, such as by a UV curing station 34. In one embodiment, the curing station 34 can includes either an LED array or lamps, to emit UV or other radiant energy. Because the web 30 is transmissive of radiant energy, the UV or other radiant energy from curing station 34 passes through web 30 to cure ink I on substrate S. In an alternative embodiment, the functions of spreader 32 and curing station 34 can be combined in a device similar to that described in U.S. application Ser. No. 12/256,670. A second heater 36 can also adjust the temperature of the web 30 and substrate S as needed following curing.

The resulting "sandwich" following the curing step is in effect a laminated print. The laminated print can be cut into print sheets by a blade such as 40, or alternatively taken up by a take-up reel (not shown).

Figure 2:
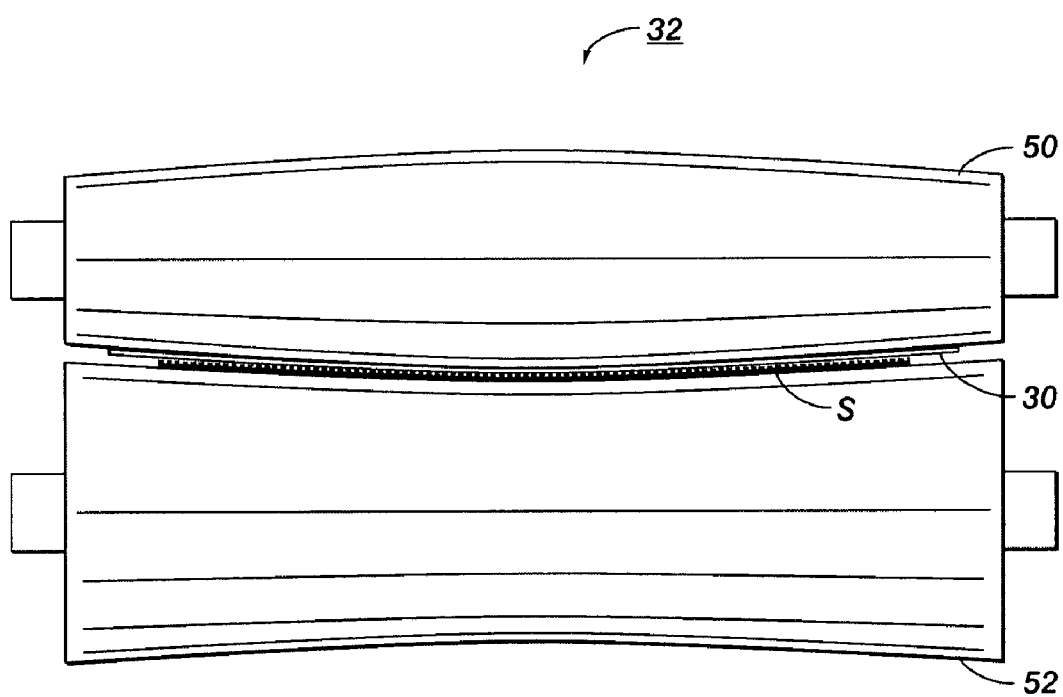
FIG. 2 is an orthogonal view of one embodiment of a spreader as would be used in an embodiment.

FIG. 2 is an orthogonal view of one embodiment of a spreader 32 such as described above. One practical concern in the present embodiment is the ability to keep the substrate S and web 30 registered to each other during the process, such that there is no relative motion between the substrate S and web 30 that would result in an image disturbance. If the rolls 50, 52 in spreader 32 are profiled, as shown, such that a curvature is formed in the web/substrate "sandwich" the increased strength of the sandwich will reduce the tendency for relative motion between the substrate S and web 30. (As used herein, "profiled" shall mean simply that one roll has other than a simple cylindrical shape.) In the illustrated embodiment, the web-side roll 50 has a concave profile and the substrate-side roll 52 has a convex profile, but the specific shapes of the rolls can be adapted for a given implementation. The effective shape of either roll can be created by relative hardness of one roll against the other. These profiled rolls can be employed in the spreader 32 as shown, or in any roller pair wherever the substrate S and web 30 are in contact with each other.

Further, regardless of the profiling of the rolls, if the substrate S and web 30 are of different widths, as shown in FIG. 2, positive traction can be maintained with at least one of the substrate S and web 30 as the sandwich passes through a roller pair.

In an alternative embodiment, the spreader 32 or any roller pair can include, instead of a roll pair, a roll- or belt-based vacuum transport system. Although the illustrated embodiment shows a vertical-shooting printhead and a horizontal substrate path, the apparatus can be arranged with a horizontal-shooting printhead and a vertical substrate path; or the active portion of the apparatus can be disposed along a portion of the circumference of a large drum.

In another alternative embodiment, there may be provided a series of spreaders 32 and/or curing stations 34 for applying pressure and/or radiant energy along the process direction in a predetermined order to achieve a desired output. For example, multiple spreaders may be desired if removal of air bubbles is of particular concern, or multiple curing stations may be useful if the ink requires a high amount of radiant energy; or multiple stations of various kinds may simply enable very high process speeds.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method of printing a digital image on a substrate, comprising:
    applying ink onto a main surface of the substrate according to image data to form an uncured full-color digital image on the main surface;
    applying a web treated with a thin layer of polyurethane or nitrocellulose to the uncured full-color digital image on the main surface of the substrate, the web being substantially transmissive of radiant energy;
    applying pressure of a predetermined magnitude to the web and the substrate to level the ink of the uncured full-color digital image;
    applying radiant energy to the uncured full-color digital image to cure the uncured full-color digital image, the radiant energy passing through the web; and
    attaching the web to the substrate.

2. The method of claim 1, wherein the ink is UV-curable.

3. The method of claim 1, further comprising:
    following applying the ink, bringing the ink to a predetermined temperature before applying the web.

4. The method of claim 1, wherein the web substantially comprises at least one of polyimide, polypropylene, or a polyester film.

5. The method of claim 1, further comprising:
    adjusting the temperature of the web and substrate following the application of radiant energy.

6. The method of claim 1, wherein the applying pressure is performed by a spreader, the web preventing the ink of the digital image from adhering to the spreader during the applying pressure.

7. The method of claim 6, wherein the spreader includes at least two rolls forming a nip for the passage of the substrate and the web therethrough.

8. The method of claim 7, wherein at least one of the rolls is profiled to reduce a relative motion between the web and the substrate.

9. The method of claim 1, wherein the substrate and the web are of different widths.

10. The method of claim 1, wherein the applying pressure is performed by a plurality of spreaders along a process direction.

11. The method of claim 1, wherein the applying radiant energy is performed by a plurality of curing stations along a process direction.

12. The method of claim 1, further comprising:
    cutting the substrate and attached web to form print sheets.

13. The method of claim 1, wherein the ink is applied directly onto the main surface of the substrate with a plurality of printheads according to the image data to build the full-color digital image on the main surface.

14. The method of claim 13, wherein the applying pressure is performed by a spreader including at least two rolls forming a nip for the passage of the substrate and the web therethrough.

15. The method of claim 14, wherein the radiant energy is applied to the web and the substrate after passing through the nip to cure the ink.

16. The method of claim 1, wherein the ink comprises one or more co-monomers and a gellant.

17. The method of claim 16, wherein the ink is applied directly onto the main surface of the substrate with a plurality of printheads according to the image data to build the full-color digital image on the main surface.

18. The method of claim 16, wherein the applying pressure is performed by a spreader including at least two rolls forming a nip for the passage of the substrate and the web therethrough.

19. The method of claim 18, wherein the radiant energy is applied to the web and the substrate after passing through the nip to cure the ink.

* * * * *